May 27, 1930.  O. LUHRS  1,760,706

APPARATUS FOR OBTAINING YEAST

Filed Feb. 29, 1928

Inventor:
Otto Luhrs

Patented May 27, 1930

1,760,706

UNITED STATES PATENT OFFICE

OTTO LUHRS, OF MANNHEIM-WALDOF, GERMANY, ASSIGNOR TO ZELLSTOFFABRIK WALDOF, OF MANNHEIM-WALDOF, GERMANY, A JOINT-STOCK COMPANY

APPARATUS FOR OBTAINING YEAST

Application filed February 29, 1928, Serial No. 258,046, and in Germany March 12, 1927.

As is well known, during the fermentation of sugar-containing liquids for the purpose of the extraction of alcohol, there takes place during the process of fermenting very considerable increases in the yeast content. These large quantities of yeast assimilate large quantities of sugar which are thereby withdrawn from the fermentation. The result of this is a considerably reduced yield in alcohol. The most favourable process of fermentation as far as the yield in alcohol is concerned, is that in which only as much yeast is contained at any moment in the fermenting vat as is required for maintaining the process of fermentation with the necessary intensity. Up to the present however it has been impossible to remove from the fermenting vat during the process of fermentation the excess of yeast as it is being formed.

It has now been found that continuous or also periodical removal of the excessive quantities of yeast from the fermenting vats during the process of fermentation can be effected in an easy and reliable manner if the layer of liquid situated immediately above the bottom of the fermenting vat is given a rotatory or gyratory motion, and at the same time the said motion is limited by suitably arranged baffles or the like to the lowermost zone of the vat. In that way, the yeast distributed over the bottom of the vat and floating in the layer of liquid immediately above it, collects in the centre of the bottom and can be withdrawn from it continuously or at certain time intervals and supplied for utilization elsewhere, for instance as fodder or manure.

The rotatory motion of the lowermost layer of liquid can be obtained by means of suitable stirring devices or by the admission of a liquid, preferably mash, in a suitable direction of flow through inlet and distributing pipes into the lowermost zone of the vat. The last mentioned method is found more particularly advantageous in the case of continuous fermentation processes in which the mass passes during fermentation through several fermenting tanks in succession. The mash is supplied just above the bottom of the vat in the manner described and drawn off at the top in order to supply it to the next vat. As means for confining the rotary motion of the fermenting liquid to the lowermost zone of the vats, can be used metal plates, planks, brushwood, rods or the like. The said means are preferably made in such a manner as not to offer to the yeast considerable surfaces for settlement.

The accompanying drawing shows by way of example a construction of apparatus embodying the invention.

Figure 1:
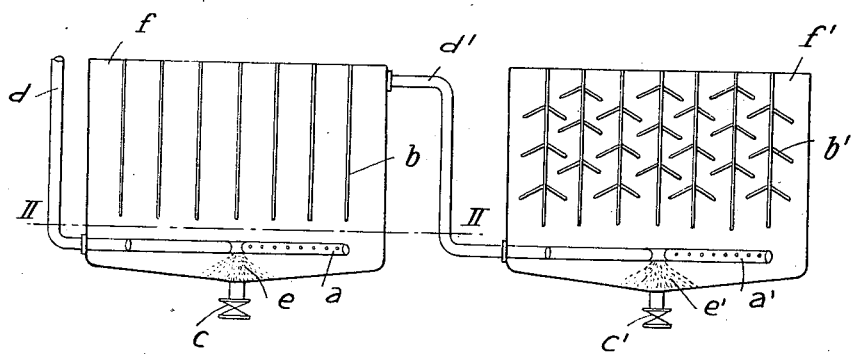

In the drawing, Figure 1 shows the apparatus in longitudinal section, and

Figure 2:
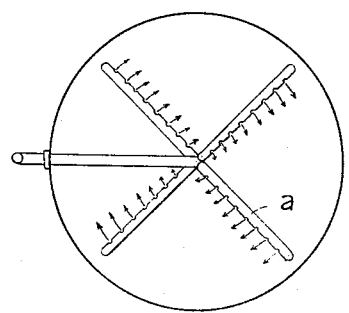

Figure 2 shows a vat in section on line II—II of Figure 1.

The vat $f$ is provided with a supply pipe $d$ for the mash or other suitable liquid, which pipe is connected to distributing pipes $a$. At the bottom of the vat is arranged a discharge pipe with a valve $c$. In the interior of the vat are mounted partitions $b$ which leave free the lowermost zone of the vat. Owing to the stirring movement limited to the lowermost zone of the vat, the yeast sinking to the bottom collects in the middle of the bottom as an accumulation or heap $e$. The vat $f$ is connected by a pipe $d^1$ to a second vat $f^1$ which is also provided with distributing pipes $a^1$ and partitions $b^1$. When operating with a continuous fermentation process, the mash escapes continuously at the top from the vat $f$ through the pipe $d^1$ and passes through the distributing pipes $a^1$ into the second vat $f^1$ and so on. A plan arrangement of the distributing pipes is shown by way of example in Figure 2.

What I claim and desire to secure by Letters Patent of the United States is:—

1. Apparatus for the obtention of yeast as a by-product in the manufacture of alcohol by fermentation of sugar-containing liquids, comprising a fermenting vat, means arranged close to the bottom of said vat adapted to impart a gyratory motion to a layer of the liquid situated above the bottom of the vat and to cause the yeast distributed on the bottom of the vat and suspended in the said liquid layer to accumulate in the center of the bottom, means adapted to limit the said gyratory motion to the lowermost zone of the vat, and means for drawing off said yeast accumulation.

2. Apparatus for the obtention of yeast as a by-product in the manufacture of alcohol by fermentation of sugar-containing liquids, comprising a fermenting vat, mechanical means arranged close to the bottom of said vat adapted to impart a gyratory motion to a layer of the liquid situated above the bottom of the vat and to cause the yeast distributed on the bottom of the vat and suspended in the said liquid layer to accumulate in the center of the bottom, a series of baffles arranged in the vat and adapted to limit the said gyratory motion to the lowermost zone of the vat, and means for drawing off said yeast accumulation as necessary.

3. Apparatus for the obtention of yeast as a by product in the manufacture of alcohol by fermentation of sugar-containing liquids, comprising a fermenting vat, means for admitting a liquid close to the bottom of the vat, said liquid imparting a gyratory motion to a layer of the treated liquid situated above the bottom of the vat and causing the yeast distributed in the bottom of the vat and suspended in the said liquid layer to accumulate in the center of the bottom, baffles arranged in the vat and adapted to limit the said gyratory motion to the lowermost zone of the vat, and means for extracting said yeast accumulation as necessary.

4. Apparatus for the obtention of yeast as a by-product in the manufacture of alcohol by fermentation of sugar-containing liquids, comprising a series of fermenting vats, means for admitting a liquid close to the bottoms of the said vats said liquid imparting a gyratory motion to a layer of the treated liquid situated above the bottom of each of the vats and causing the yeast distributed on the bottoms of the vats and suspended in the liquid situated directly above them to accumulate in the centers of the bottoms, means in the vats adapted to limit the said gyratory motion to the lowermost zone of each, means enabling the treating liquid to be used in each of the vats successively, and means for extracting the accumulated yeast as necessary.

5. Apparatus for the obtention of yeast as a by-product in the manufacture of alcohol by fermentation of sugar-containing liquids, comprising a series of fermenting vats, branched pipes situated close to the bottom of each of the vats, said pipes being adapted for admitting liquid to the vats to impart a gyratory motion to a layer of the treated liquid situated above the bottoms of the vats, said gyratory motion causing the yeast distributed on the bottoms and suspended in the liquid directly above the same to accumulate in the center of said bottoms, a series of baffles arranged in the vats and adapted to confine the said gyratory motion to the lowermost zone of each, means for supplying the motion-producing liquid to the branched pipes of the first vat, means for conducting said liquid successively from one vat to the branched pipes of the adjacent vat, and outlets from the vats for withdrawal of the yeast accumulated on the bottom of each as necessary.

OTTO LUHRS.

CERTIFICATE OF CORRECTION.

Patent No. 1,760,706.  Granted May 27, 1930, to

OTTO LUHRS.

It is hereby certified that the above numbered patent was erroneously issued to "Zellstoffabrik Waldof, of Mannheim-Waldof, Germany, a joint-stock company", as owner of the entire interest in said invention, whereas said patent should have been issued to the inventor, said "Luhrs, and Zellstofffabrik Waldof, of Mannheim-Waldof, Germany, a joint-stock company", said company being assignee of one-half interest only in said invention, as shown by the records of assignments in this office; and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.